US012011723B2

(12) United States Patent
Klokow et al.

(10) Patent No.: US 12,011,723 B2
(45) Date of Patent: Jun. 18, 2024

(54) LEVER SYSTEM FOR FORCE TRANSMISSION

(71) Applicant: LOESCHE GmbH, Düsseldorf (DE)

(72) Inventors: Alexander Klokow, Düsseldorf (DE); Dirk Grube, Düsseldorf (DE); Thomas Letsch, Düsseldorf (DE); Jörg Bettenworth, Düsseldorf (DE)

(73) Assignee: LOESCHE GmbH, Düsseldorf (DE)

( * ) Notice: Subject to any disclaimer, the term of this patent is extended or adjusted under 35 U.S.C. 154(b) by 380 days.

(21) Appl. No.: 17/298,788

(22) PCT Filed: Apr. 4, 2019

(86) PCT No.: PCT/EP2019/058516

§ 371 (c)(1),
(2) Date: Jun. 1, 2021

(87) PCT Pub. No.: WO2020/200455

PCT Pub. Date: Oct. 8, 2020

(65) Prior Publication Data

US 2022/0032311 A1 Feb. 3, 2022

(51) Int. Cl.
*B02C 15/04* (2006.01)

(52) U.S. Cl.
CPC .................................... *B02C 15/04* (2013.01)

(58) Field of Classification Search
CPC ................................ B02C 15/00; B02C 15/04
See application file for complete search history.

(56) References Cited

U.S. PATENT DOCUMENTS 2,112,359 A * 3/1938 Crites ..................... B02C 15/04 241/109
3,591,094 A * 7/1971 Gauer ..................... B02C 15/04 241/121
3,774,854 A * 11/1973 Poeschl ................... B02C 15/04 241/117

(Continued)

FOREIGN PATENT DOCUMENTS

CN 1086462 A 5/1994
CN 101060933 A 10/2007

(Continued)

OTHER PUBLICATIONS

International Search Report relating to PCT/EP2019/058516 filed Nov. 6, 2019. dated Nov. 13, 2019.

(Continued)

*Primary Examiner* — Faye Francis
(74) *Attorney, Agent, or Firm* — Dinsmore & Shohl LLP

(57) ABSTRACT

The invention relates to a lever system for force transmission for a grinding roller. A more cost-efficient, simplified lever system is to be created which no longer requires the integration into a mill stand but is more easily accessible for installation and maintenance works. For this purpose, provision is made in particular in that on the central rocking lever of the grinding roller an eccentrically arranged side lever is provided which has a lever arm extending in the opposite direction to the grinding roller and in that the force transmission onto rocking lever and grinding roller takes place via a lever arm of the side lever and a piston rod of the hydraulic cylinder.

10 Claims, 7 Drawing Sheets

(56) References Cited

U.S. PATENT DOCUMENTS

| | | | | | |
|---|---|---|---|---|---|
| 3,822,829 | A * | 7/1974 | Brundiek | B02C 15/04 | 241/117 |
| 4,218,023 | A * | 8/1980 | Brundiek | B02C 15/04 | 241/121 |
| 4,235,385 | A * | 11/1980 | Brundiek | B02C 15/04 | 241/110 |
| 4,620,674 | A * | 11/1986 | Hanstine | B02C 15/04 | 241/289 |
| 4,828,189 | A * | 5/1989 | Schonbach | B02C 15/04 | 241/121 |
| 5,244,157 | A * | 9/1993 | Brundiek | B02C 15/04 | 241/36 |
| 2010/0252667 | A1* | 10/2010 | Dilly | B02C 15/04 | 241/230 |
| 2011/0121116 | A1* | 5/2011 | Scholz | B02C 15/004 | 475/331 |
| 2020/0047187 | A1* | 2/2020 | Batri | B02C 15/04 | |

FOREIGN PATENT DOCUMENTS

| | | | |
|---|---|---|---|
| CN | 101568387 | A | 10/2009 |
| CN | 102284322 | A | 12/2011 |
| CN | 103084241 | A | 5/2013 |
| CN | 103747876 | A | 4/2014 |
| CN | 205084804 | U | 3/2016 |
| CN | 105764613 | A | 7/2016 |
| CN | 108698049 | A | 10/2018 |
| CN | 208177516 | U | 12/2018 |
| DE | 2166219 | A1 | 7/1973 |
| DE | 19839162 | A1 | 3/2000 |
| DE | 102006061328 | A1 | 6/2008 |
| DE | 102006061506 | A1 | 6/2008 |
| JP | 65222160 | A | 2/1977 |
| JP | S52022160 | A | 2/1977 |
| JP | H0716483 | A | 1/1995 |
| NO | 2011145527 | A1 | 11/2011 |
| WO | 2006072275 | A1 | 7/2006 |

OTHER PUBLICATIONS

International Preliminary Report relating to PCT/EP2019/058516 filed Apr. 4, 2019. dated Feb. 5, 2021.
Japanese Office Action dated Jan. 19, 2023, relating to JP Patent Application No. 2021-538817.
Chinese First Office Action & Search Report dated May 27, 2022, relating to CN Patent Application No. 201980079177.6.
Japanese Patent Application No. 2021-538817, Notice of Reasons for Refusal, dated Jun. 2, 2023.

* cited by examiner

LEVER SYSTEM FOR FORCE TRANSMISSION

TECHNICAL FIELD

The invention relates to a lever system for force transmission for a grinding roller according to the preamble of claim 1.

BACKGROUND

Lever systems of this type are used in particular in roller mills or vertical mills for the comminution of grinding material such as cement clinker or coals.

With regard to such vertical mills reference is made to WO 2005/028112 A1 for example.

In FIGS. 6 and 7 an example of such lever systems 50 is shown too. The perspective side view according to FIG. 6 shows a conical grinding roller 51 which in operation rolls with its grinding surface in a force-locked and frictionally engaged manner on a grinding material to be comminuted. A sufficiently known grinding table with grinding material conveyed thereon is not illustrated in FIGS. 6, 7.

The lever system 50 customarily employed so far has an upward-protruding rocking lever fork 53 which is supported on a rocking lever axis 54 and in operation firmly is connected to an L-shaped central rocking lever 52. The central rocking lever 52 accommodates the axis of the grinding roller 51 which is supported at the end facing towards the grinding table.

The rocking lever fork 53 which extends in the downward direction and is slightly bent towards the center of the mill is connected on both sides at the lower end to a respective hydraulic cylinder 56, 57 by way of hinge eyelets 67. Together with the pump units 63 and the accumulator units 64 these hydraulic cylinders 56, 57 form the hydropneumatic spring system for the grinding roller 51. To increase the compressive forces of the grinding roller 51 onto the corresponding grinding material the hydraulic cylinders with their piston rods and the connection via the hinge eyelets 67 act by applying tensile forces onto the rocking lever 53 and thus onto the grinding roller, whereby, in particular, cracks and fractures can appear in the rocking lever due to the forces occurring.

In their hitherto existing design the known lever systems are integrated in mill stands 60 of steel so that in a vertical mill with four grinding rollers four mill stands 60 with corresponding lever systems 50 are arranged equidistantly around the grinding table of the vertical mill.

The drawback with this known lever system is the relatively great effort and the high costs that arise in particular due to a cast rocking lever fork and the design of the hydropneumatic spring system. Likewise, the hitherto employed principle of applying tension to the rocking lever to increase the compressive forces onto the grinding roller requires improvement. In the case of a necessary dismantling of the rocking lever fork 53 this requires a considerable amount of work as this usually necessitates drilling out of the rocking lever axis 54. In addition, accessibility and handling of the structural components integrated in the mill stand of previous lever systems also appears to be in need of improvement.

SUMMARY

Therefore, the object of the invention is to overcome the drawbacks of previous lever systems for grinding rollers and thereby be more cost-efficient as well as easier in terms of installation and maintenance.

In accordance with the invention this object is achieved by a lever system for the force transmission onto a grinding roller having the features of claim 1.

An essential core idea can be seen in the fact that a rocking lever fork hitherto used for the force transmission onto the grinding roller is abandoned and instead provision is made on the central rocking lever for an eccentrically arranged side lever having a lever arm which extends in the opposite direction to the grinding roller and at the end of which the force coupling to the piston rod of a hydraulic cylinder is provided. In this case, the arrangement between the hydraulic cylinder and the end of the side lever is realized such that the piston rod of the hydraulic cylinder can act in a substantially perpendicular manner onto the end of the lever arm of the side lever facing away from the grinding roller.

With regard to the ability of the grinding roller to swing out from its normal operating position in the region of the grinding track of the mill into an approximately vertical position of the grinding roller axis for maintenance or repair purposes the side lever is arranged such that it can be easily uncoupled from and coupled to the central rocking lever.

Furthermore, one proceeds by placing the rocking lever axis and the hydraulic cylinder on a bearing pedestal, in particular on a stepped concrete pedestal. In this way, a relatively cost-efficient bearing block for the rocking lever axis and the hydraulic cylinder is accomplished, in which case this relatively open arrangement brings about improvements with regard to maintenance, installation and dismantling of structural components rather than integrating the lever system into a largely closed mill stand and placing essential structural components and modules externally of supporting structures for better accessibility.

The lever system according to the invention can also be referred to as tilting lever concept since a force is applied to the side lever in a largely perpendicular or vertical manner by means of the hydraulic cylinder. This also allows relatively easy modification of the grinding force which acts on the grinding material during operation and consists of a combination of the weight force of the grinding roller and the hydraulic force additionally generated by the hydraulic cylinder. The hydraulic cylinder is preferably arranged on a concrete pedestal of the lower mill part. This arrangement of the hydraulic cylinder with coupling to the side lever and the central rocking lever enables a functioning as a pressure cylinder during grinding operation, as opposed to most conventional mills, in which the cylinder is pressurized on the side of the piston rod and therefore operates as a tension cylinder.

Due to the fact that during grinding operation a force is applied to the lower piston-sided cylinder chamber of the hydraulic cylinder it is possible that according to the relation of the piston surface to the surface on the side of the piston rod the hydraulic cylinder can be of smaller and more cost-efficient construction in this corresponding arrangement.

Moreover, on account of the largely perpendicular arrangement of the hydraulic cylinder and its piston rod transverse forces onto the pistons, piston rod guides and pistons and their sealings are prevented which, in the previous conventional inclined arrangement of the hydraulic cylinder(s), could lead to damage on these elements. The design and arrangement according to the invention therefore brings about a reduced load of the piston of the hydraulic cylinder so that the hydraulic cylinder can be of simpler design and designed with less load capacity.

The concept according to the invention thereby also reduces the risk of failure of the entire mill due to a damage on the stated structural components.

Although account must also be taken of the fact that due to the eccentric arrangement of the side lever an uneven load of both bearings of the rocking lever axis in the bearing block is present, according to the invention this unevenness is compensated in that the bearing located on the side of the side lever is designed larger than the bearing which is located opposite the side lever and the design of which can in particular be of smaller, more cost-efficient dimensions than the direct bearing for the side lever. Both bearings are preferably designed as roller bearings.

Due to the arrangement and alignment of the hydraulic cylinder on a concrete pedestal there is also the advantageous possibility to position the necessary pump and accumulator units for the corresponding spring system of the mill locally close, i.e. closely adjacent to the hydraulic cylinder on the concrete pedestal. For this respectively short hydraulic connection between the pump and accumulator units on the one hand and the hydraulic cylinder on the other hand flexible high-pressure hoses can be used due to the locally close set-up, whereby installation times as well as component costs can be reduced considerably.

The lever system according to the invention and the locally close arrangement of essential structural components, such as hydraulic cylinder, side lever and pump and accumulator units, with respect to each other is also aimed at realizing a simplified construction of a mill in its entirety by assigning to each individual roller module a lever and hydraulic system of its own so that laborious pipe connections between opposite grinding rollers can be avoided.

Compensation of the roller forces of opposite grinding rollers during operation of a roller mill and the achievement of an almost even load of slide bearings, in particular the axial slide bearing of the gear transmission positioned below a grinding table of a mill, is implemented in the present concept by means of an electronic regulation of the roller forces, thus allowing the mill's spring system of each individual roller module to be quickly regulated electronically.

In addition, the lever system according to the invention is designed such that a swinging-out of the grinding roller from an operating position in the region of the grinding track into a largely vertical, upward-tilted position can be carried out relatively easily.

For this purpose, a separate unit with hydraulic cylinder and piston rod is arranged on the concrete pedestal in the free region of the central rocking lever which is located laterally with respect to the side lever. To this end, on the free side of the lever system a hydraulic cylinder with a piston rod of greater length is provided, the upper end of which is fastened directly or indirectly on the central rocking lever while the lower base block of the hydraulic cylinder is linked to the concrete pedestal or a stepped region located slightly lower. After a fastening flange of the side lever to the central rocking lever has been released it is then possible, on actuation of the hydraulic swing cylinder, to raise the grinding roller and swing it outwards and upwards at least up to a vertical position.

In a further development of the invention the side lever is expediently designed in a triangular shape or L-shape, with its longer leg being force-coupled to the hydraulic cylinder and aligned approximately parallel to the roller axis. In this case, by an approximately parallel arrangement an angle of 10° to 15° between the longer L-leg and the longitudinal axis of the roller axis is also to be understood.

In the end region of the shorter L-leg of the side lever a force-locked and/or flange-like fastening to the central rocking lever is expediently provided. In this way, a form-locked connection between the side lever and the central rocking lever can be created. Thus, required is only a simple and one-sided release of the corresponding fastening to achieve a swinging-out of the grinding roller so that the effort of dismantling these connection elements as compared to a two-sided arrangement on the rocking lever is reduced considerably.

Furthermore, the eccentric arrangement of the side lever and of the corresponding hydraulic cylinder allow for a better accessibility for the coupling of a separate hydraulic swing cylinder to swing out the grinding roller and for maintenance works in this region.

BRIEF DESCRIPTION OF THE SEVERAL VIEWS OF THE DRAWINGS

The invention is explained in greater detail hereinafter by way of a schematic exemplary embodiment, wherein show.

DETAILED DESCRIPTION

Figure 1:
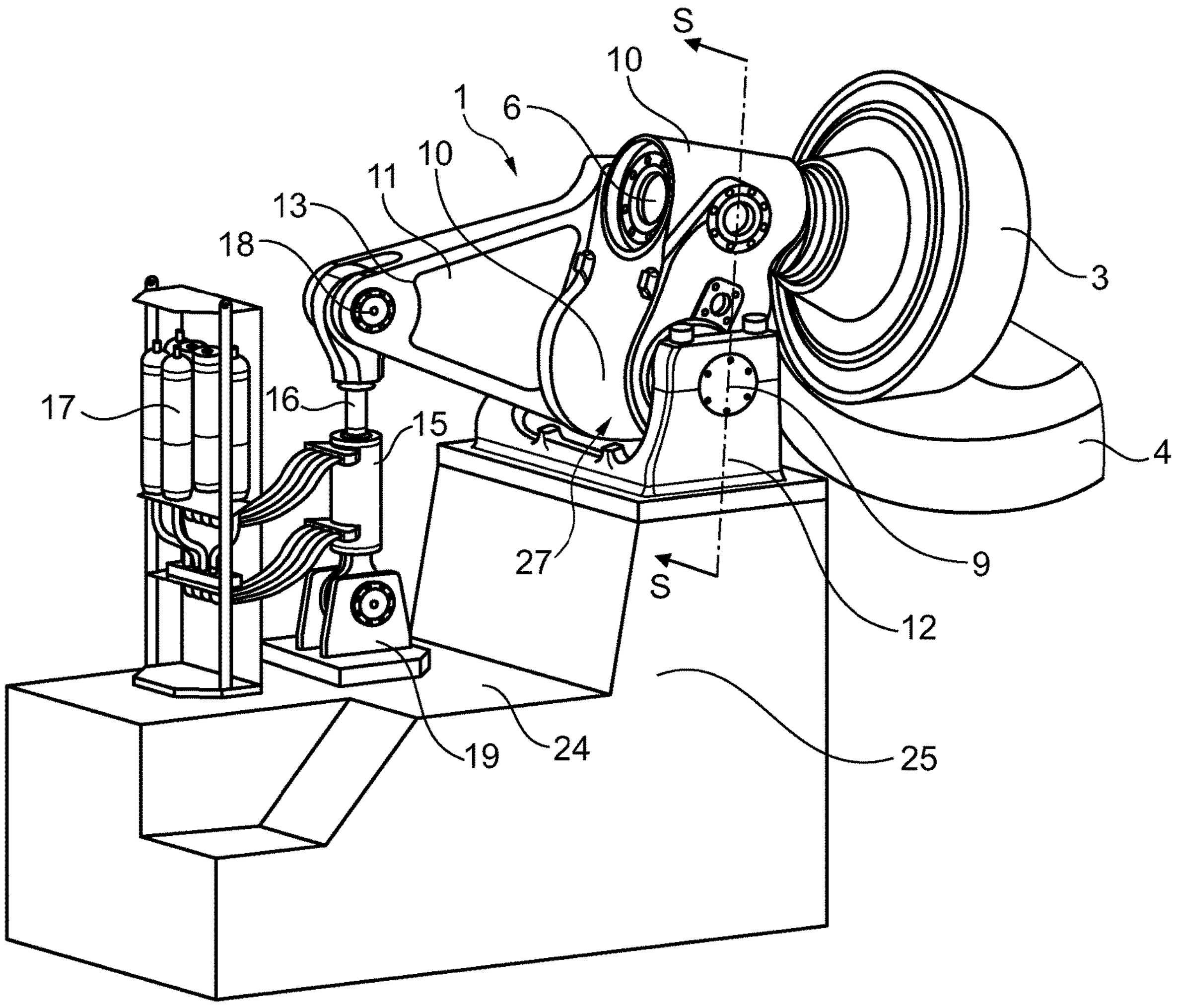
FIG. 1 a perspective view of a lever system depicted from the outside in the direction of a grinding table of a roller mill, in which case only a single module of a grinding roller with lever system is shown.

In FIG. 1 a lever system 1 according to the invention is shown schematically in perspective view in the direction of a corresponding grinding table 4. A conical grinding roller 3 which in operation rolls in a force-locked and frictionally engaged manner on grinding material to be comminuted is guided with its roller axis 6 in a central rocking lever 10.

The central rocking lever 10 is arranged via a rocking lever axis 9 in a U-shaped bearing block 12 which, in the example, is fastened on a stepped concrete pedestal 25.

Figure 2:
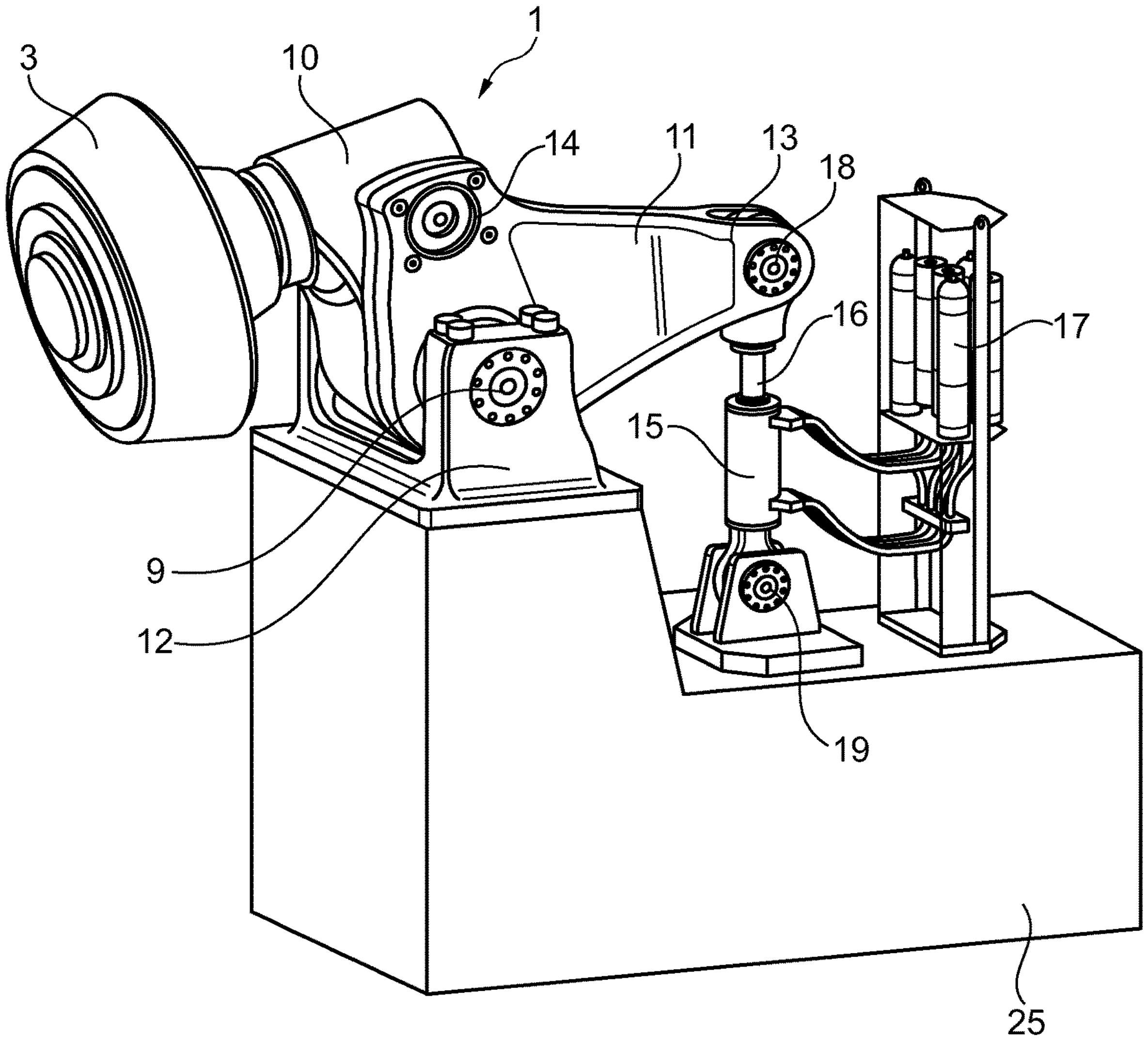
FIG. 2 the example of the lever system according to FIG. 1 in a lateral perspective view, depicted, as it were, from the interior of a roller mill.

In the perspective side view on the lever system 1 according to FIG. 2 a side lever 11 located in the left lateral region of the central rocking lever 10 is on the one hand firmly attached via a flange-like fastening 14, in which case the side lever 11 is supported in the lower region on the rocking lever axis 9.

The side lever 11 which is of approximately triangular or L-shaped design faces with its longer leg of the L-shape in the opposite direction to the grinding roller 3 or rather its grinding roller axis 6. For the application of force to the side lever 11 provision is made in the end region of the lever arm 13 for a fastening eyelet 18, via which a piston rod 16 of a hydraulic cylinder 15 is in engagement with the side lever 11.

The hydraulic cylinder 15 is fastened by way of a base block 19 on the region of the pedestal 24 of the concrete block.

Furthermore, arranged at a short distance or locally close to the hydraulic cylinder 15 is an accumulator unit 17 which is connected via corresponding high-pressure hoses to the hydraulic cylinder 15 and its cylinder chambers. A pump unit assigned to the accumulator unit 17 is not illustrated in FIG. 1. Together with the hydraulic cylinder 15 to which a force can be applied on both sides the pump and accumulator unit 17 forms a hydropneumatic spring system for the grinding roller 3. On the other hand, the illustrated arrangement between the hydraulic cylinder 15, the piston rod 16 and the largely perpendicular arrangement to the lever arm 13 of the side lever 11 enables the functioning of the hydraulic cylinder 15 as a pressure cylinder so that through this the necessary hydraulic force to be applied to the grinding roller and the grinding material on the grinding table 4 can be ensured during the grinding operation.

Figure 4:
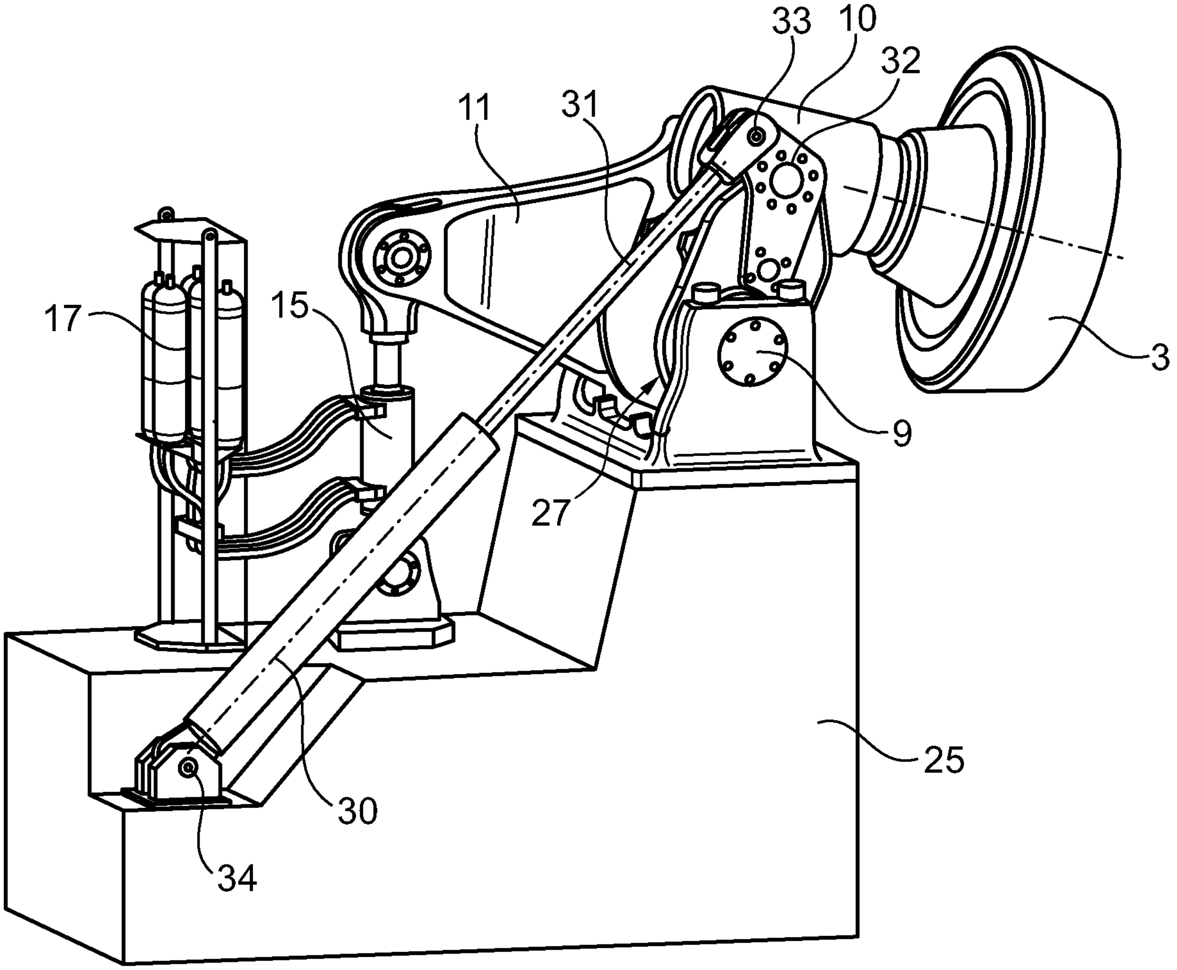
FIG. 4 the example according to FIG. 1 with installed hydraulic swing cylinder in a free region opposite the side lever.
Figure 5:
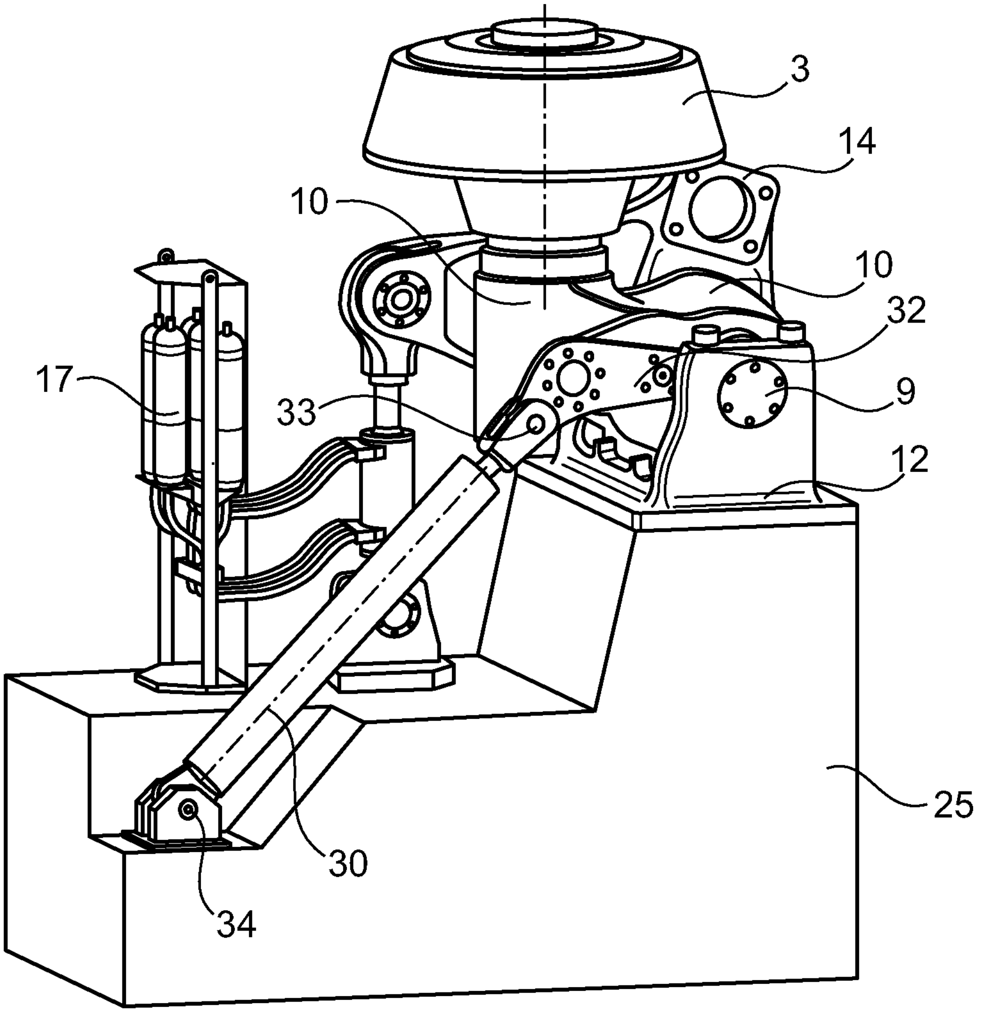
FIG. 5 the example according to FIG. 4 with the grinding roller swung out into a vertical position.
Figure 6:
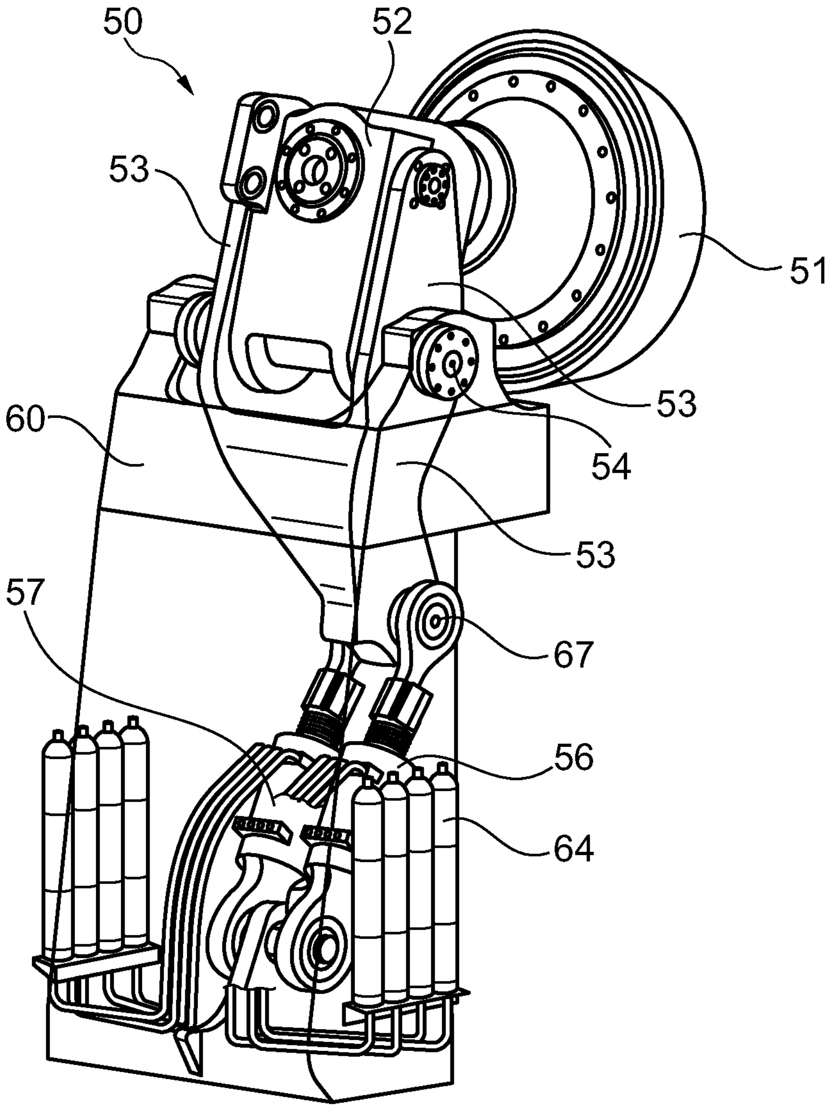
FIG. 6 the example of a lever system according to prior art with a rocking lever fork and the arrangement of two hydraulic cylinders for actuation thereof, with accommodation within a mill stand, and FIG. 7 the example according to FIG. 6 pursuant to the prior art in perspective view from the interior of the housing of a roller mill towards the outside.
Figure 7:
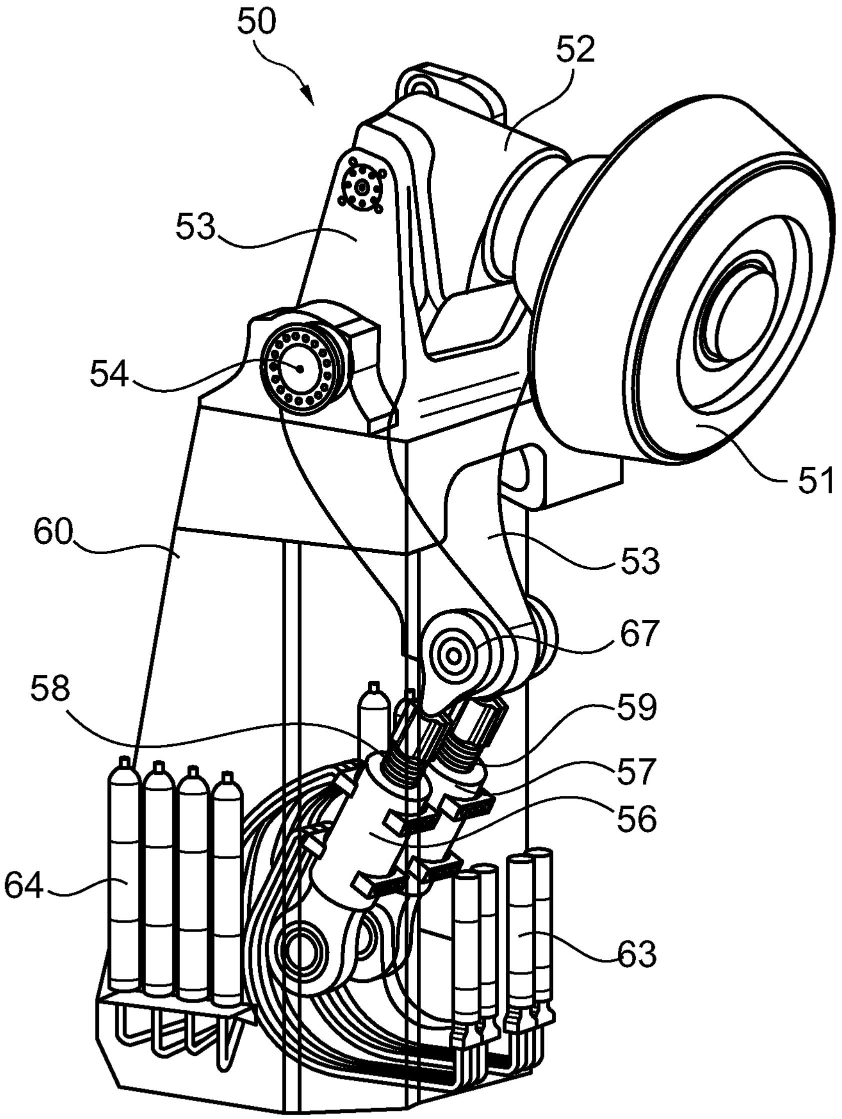

Since the side lever 11 is attached eccentrically and only on one side of the central rocking lever 10 a free lateral region 27 remains on the other side, in which a hydraulic swing cylinder 30 can be arranged as illustrated in FIGS. 4 and 5.

Figure 3:
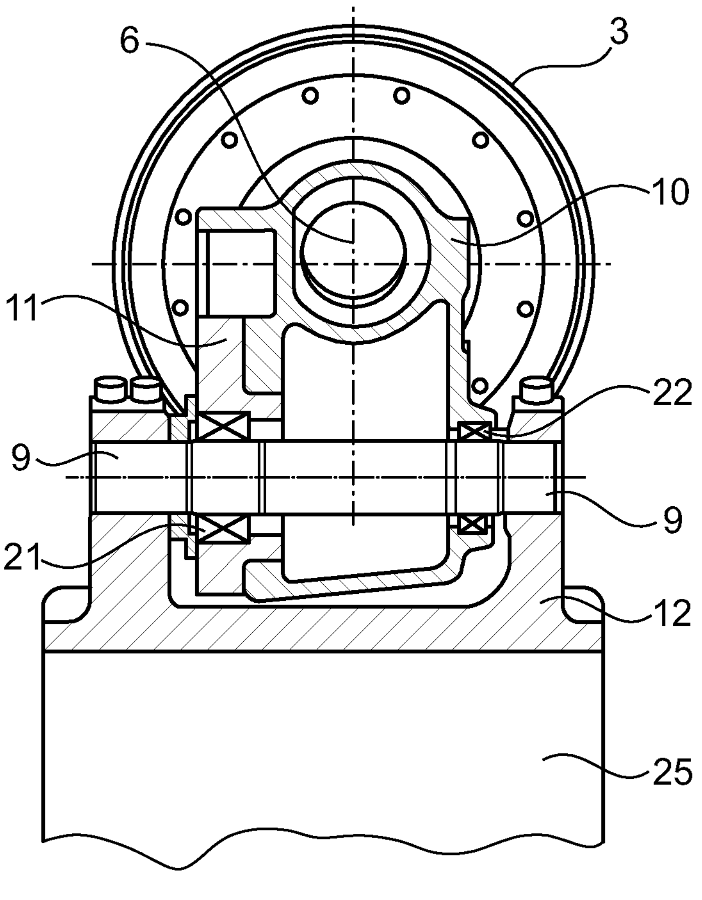
FIG. 3 a simplified sectional view along the line S-S according to FIG. 1 in the region of the respective rocking lever axis, depicted in the direction of the grinding table.

In FIG. 3 a sectional view corresponding to the line S-S according to FIG. 1 is shown in a simplified and schematic manner. Due to the eccentric arrangement of the side lever 11 on the left side of the central rocking lever 10 the corresponding bearing 21, which preferably is a roller bearing, is of slightly larger design than the bearing 22 provided on the right side, wherein by means of both bearings 21, 22 the weight forces of the grinding roller 3, its roller axis 6 and of the central rocking lever 10, including those of the side lever 11, are transmitted onto the rocking lever axis 9 and subsequently into the bearing block 12.

In FIG. 4 a perspective side view on the lever system 1 according to FIG. 1 is illustrated, wherein in this Figure a hydraulic swing cylinder 30, starting from a base block 34 fastened on the concrete pedestal 25, reaches with its piston rod 31 up to a head block 33. This head block 33 engages in a rotative manner on a coupling plate 32 which is rigidly fixed on the central rocking lever 10.

Therefore, should it become necessary to swing the grinding roller 3 from the position shown in FIG. 4 into a largely vertical swung-out position, as shown in FIG. 5, in the example according to FIG. 4 an application of force to the hydraulic swing cylinder 30 is required such that the piston rod 31 is retracted into the cylinder. As a result of this movement process, as shown in FIG. 5, the grinding roller 3 is swung from its position (FIG. 4) inclined towards a grinding table 4 into a position swung out of the housing of a roller mill according to FIG. 5. This largely vertical swung-out position of the grinding roller 3 is in particular assumed for maintenance or repair purposes on the grinding roller 3 or the entire roller mill.

The concept according to the invention with the eccentric arrangement of the side lever 11 and the largely perpendicular force coupling of the hydraulic cylinder 15 with piston rod 16 enable on the one hand a relatively simple and reliable pressurization of the grinding roller 3.

On the other hand, opposite the side lever 11 a free lateral region 27 is created, in which a hydraulic swing cylinder 30 to swing out the grinding roller 3 can be arranged relatively easily and quickly, in which case the installation and dismantling of these structural components on the open concrete pedestal 25 can also be handled well because use is not made of the integration of the entire lever system into a largely closed mill stand, as it is conventionally the case.

Moreover, the abandoning of a hitherto employed rocking lever fork, specifically consisting of cast material, and, in lieu thereof, the utilization of a side lever, consisting of a steel plate where appropriate, leads to a significant cost reduction.

The invention claimed is:

1. A lever system and grinding roller for force transmission for the grinding roller,
   - with a central rocking lever having a rocking lever axis that is supported on a bearing block, and
   - with a hydraulic cylinder having a piston rod for the application of force to the rocking lever,
   - wherein:
   - on the central rocking lever an eccentrically and only on one side of the central rocking lever arranged side lever is provided,
   - in that the side lever has a lever arm extending in the opposite direction to the grinding roller and
   - in that a force coupling is provided between the lever arm of the side lever and the piston rod of the hydraulic cylinder.

2. The lever system according to claim 1,
   wherein:
   the hydraulic cylinder is arranged such that a perpendicularly effective force coupling to the lever arm of the side lever can be achieved.

3. The lever system according to claim 1,
   wherein:
   the side lever is arranged in a manner that it can be uncoupled from and coupled to the central rocking lever.

4. The lever system according to claim 1,
   wherein:
   the bearing block of the rocking lever axis and the hydraulic cylinder are provided on a bearing pedestal.

5. The lever system according to claim 1,
   wherein:
   the hydraulic cylinder acts in a pressurized manner onto the side lever and the grinding roller.

6. The lever system according to claim 1,
   wherein:
   the rocking lever axis is supported by means of two different bearings and in that the bearing on the side of the side lever is designed larger than the bearing opposite thereto.

7. The lever system according to claim 1,
   wherein:
   to swing out the grinding roller a separate unit with hydraulic cylinder and piston rod can be arranged on the bearing pedestal in a free lateral region with respect to the side lever.

8. The lever system according to claim 1,
   wherein:
   a pump and accumulator unit required for the hydraulics can be arranged locally close to the hydraulic cylinder, in particular on the stepped concrete pedestal.

9. The lever system according to claim 1,
   wherein:
   the side lever is of triangular shape or L-shape and its longer leg is force-coupled to the hydraulic cylinder and aligned parallel to the roller axis.

10. The lever system according to claim 9, wherein an end region of a shorter L-leg of the side lever a flange fastening to the central rocking lever is provided.

* * * * *